Patented May 5, 1925.

1,536,882

UNITED STATES PATENT OFFICE.

CARLETON ELLIS, OF MONTCLAIR, NEW JERSEY.

MOLDING COMPOSITION.

No Drawing.   Application filed October 18, 1922.  Serial No. 595,279.

*To all whom it may concern:*

Be it known that I, CARLETON ELLIS, a citizen of the United States, and a resident of Montclair, in the county of Essex and State of New Jersey, have invented certain new and useful Improvements in Molding Compositions, of which the following is a specification.

This invention relates to a molding powder and process of making same which molding powder or composition is prepared from urea or its appropriate derivatives and formaldehyde or its appropriate derivatives.

The object of the present invention primarily is to render available the means to produce a white molding powder which when hot-pressed will flow to take the shape of a mold and will yield a clear, white transparent article or one possessing the whiteness of porcelain or one which by suitably tinting will give the color of ivory or old ivory or delicate shades of pink, lavender or other colors that may be desired. It also may be added that the composition may of course be employed for making dark colored articles such as brown or black but as these may be readily made from molding powders now available compositions of this character do not fill a want as urgent as that which would be supplied by the white or light colored molding compositions. The resinous condensation products of phenol and formaldehyde are not very satisfactory for making light colored products because of the tendency to turn reddish. Thus cigarette holders and the like made of such material and originally of an amber color may acquire a reddish tone which greatly impairs the appearance.

In the present invention a composition is rendered available which may be molded into various articles, transparent or possessing a pure snow-white or light color not darkening or discoloring through the action of light or air under normal conditions of use.

To produce a molding powder which will meet commercial requirements means primarily one which can be molded very rapidly requiring only a few minutes' time, for example, 3 to 5 minutes for thin pieces and 5 to 10 minutes for heavier articles. The labor cost of molding requires such a molding powder to be very rapidly molded to shape. In the present instance it is desirable in some cases to have available a powdered material which when placed in the mold and exposed to the action of a hot press will first flow to every corner of the mold to make a sharp impression and then will set or become thermo-rigid so that the articles can be taken out of the mold just as rubber or hard rubber is cured under heat and pressure.

For this purpose dimethylol urea or its products of dehydration may be used. Compounds formed by the reaction of formaldehyde on urea have been frequently discussed in the literature as for example by Goldschmidt, Berichte 1896, 2438; Chem. Ztg. 1897, 46, 460 and 586; Holzer, Berichte 1884, 17, 659; 18. 3302; Tollens, Berichte 1896, 2751; Einhorn and Hamburger, Berichte 1908, 41, 24; Dixon, Trans. Chem. Soc. 1918, 113, 238, and others.

In the present invention it is particularly an object to mold dimethylol urea or its appropriate derivatives or dehydration products with or without a filler.

The preparation of a molding compound which works properly in the mold is one which involves no little difficulty in a product of this sort which in the preferred form has to be white in color. The piece undergoing molding should not blister through the evolution of gases or water vapor and should not stick to the mold or act upon the metal surface of the latter. Usually the article is required to have a high gloss. It also in many cases is required to be infusible and difficult to ignite. A product which may be used to comply favorably with the foregoing conditions is obtained from dimethylol urea preferably in the presence of an acid catalyst which does not have a bad effect on the mold. Phthalic anhydride may for example be used in some cases while in other cases oxalic acid may be employed. Trichloracetic acid has very rapid setting action. By keeping the composition slightly on the acid side the heat does not tend so much to yellow the material as is the case when an alkaline substance is present.

A suitable general procedure is the following.

1. React on urea and aqueous formaldehyde employing a base such as caustic soda or calcium or barium hydrate to neutralize or render the solution slightly alkaline whereby methylol or dimethylol urea is formed. Preferably proportions of formaldehyde greater than that forming the monomethylol compound is desired. Even though the solution is rather concentrated the dimethylol urea as a rule does not separate immediately but if allowed to stand will form a white magma. While the dimethylol persists in solution in a supersaturated or colloidal state it may be treated advantageously as follows.

2. Acidulate the solution with preferably a strong mineral acid, mineral acids such as phosphoric, sulphuric or hydrochloric acid having the greatest activity.

3. When acidulated with a strong acid reaction usually takes place quite rapidly with evolution of heat and the liquid sets to a white mass. After a time the mass cast in a mold may be removed and it will be found quite hard. Thick blocks of the material will frequently have a different structure in the exterior layers from the center. The outer layers will have a pearly slightly translucent appearance while the interior will be white and opaque. This may be due to overheating of the central portion. In any event the exterior layers having the translucent appearance when allowed to dry for several weeks at room temperature or more rapidly by cautious vacuum drying give a clear transparent very hard material. During the drying shrinkage occurs and if the reaction has progressed so that white opaque material forms in the center the shrinkage of the exterior takes place in such a way as to cause cracks. In a number of cases cast articles have gradually become transparent on standing for several weeks but at the same time the cast article has fallen into small fragments due to shrinkage strains. The reaction mixture may therefore be poured out in thin layers and overheating avoided so that the entire material is of a milky translucent appearance.

4. This milky solid in acid condition may be pulverized and dried by general heating as for example in a vacuum dryer or it may allowed to dry in the air. This takes place more rapidly when the material is pulverized. After drying out somewhat in the open air it becomes very hard to grind and a ball mill may be used.

5. The powder or fragments obtained by drying and which in most cases are clear and transparent may then be molded in a hot press employing a temperature of say 320° F. and a pressure which is normally higher than that employed in molding operations. Plastics very generally are pressed at one ton per square inch but in the present case I prefer to use two tons per square inch to consolidate the material. In this way a clear transparent water white or light colored molded article may be obtained.

Ordinarily aqueous formaldehyde of 40 per cent strength may be used or the gas itself may be employed or paraform or trioxymethylene. A good result is obtained by adding some paraform to aqueous formaldehyde to obtain greater concentration. In the presence of the urea and the alkali the paraform dissolves. In place of urea its appropriate derivatives may be employed. Carbanilid may be used in some cases especially for dark colored products.

Fillers such as asbestos, wood flour and the like, coloring agents, also fluxes may be added, likewise various resins and glue, albumen, casein, glycerine, fire-proofing salts.

In some cases acetaldehyde may be employed alone or along with formaldehyde. The procedure does not exclude the use of other appropriate aldehydes.

When the acidity of the molding powder has a bad effect on the mold the powder may be washed with water to remove any free acid, or in some cases a mineral filler containing a small amount of alkaline material sufficient to neutralize the acidity may be incorporated with the dimethylol urea derivative.

The nature of the material which is molded is not definitely known. When proportions of formaldehyde and urea to make dimethylol urea are employed and the solution acidulated giving a white transparent product this material of itself sets to a very hard mass, white and opaque which has a certain amount of elasticity so that a ball cast of the material will bounce in a notable manner from a hard floor. Also it is very tough and extremely hard being much harder than a great many mineral substances. It is insoluble in water and practically unaffected by soaking in cold water for an indefinite period. In boiling water it gradually softens and disintegrates. It is when the material is in this particular form, that is insoluble in cold water but affected by boiling water and having the various characteristics mentioned that I prefer to employ it in molding compositions. The greater the degree of dehydration, the clearer and more transparent the material of the molding composition and the clearer and more transparent the molded article. As I particularly desire to produce masses which when molded have the clarity of glass but which are hard, rough and resistant it is highly desirable to carry on the dehydration of the acid material to a point where it will just flow in the mold under pressures of two tons and at a temperature of say 320°–350° F.

A white filler such as gypsum, china clay, lithopone, etc., may be admixed with the dimethylol urea compound at the time of casting in acid solution. Or if the white filler is of a basic character the material may be made up without the use of an acid. The molding composition itself may be in the form of a powder or in sheets or fragments.

Sheeted material or coarse pieces or tableted material offers the most satisfactory results in quick molding in some cases especially at temperatures above 350° F.

What I claim is:

1. The process of making a white molding powder which comprises incorporating urea and formaldehyde in about the proportions to form dimethylol urea in the presence of water adding an alkaline substance and allowing reaction to take place to about the point of turbidity, neutralizing, incorporating the resulting solution with a white filler, and drying.

2. The process which comprises mixing a compound of urea and formaldehyde with a filler, drying and baking to the point where the mix will flow in the mold under heat and pressure, then solidify quickly.

3. In the process of making a commercially-feasible molding composition from urea and formaldehyde capable of being molded to a rigid article by hot-pressing for only a few minutes the step which comprises baking a mixture of the urea-formaldehyde material and a filler until reaction has progressed to a point at which the mix will flow in the mold and quickly set without blistering.

4. A molding powder containing dehydrated dimethylol urea and a white filler.

5. A molding powder comprising a baked mixture of a methylol urea and a white filler.

6. A molding powder comprising baked methylol urea, asbestos fibre and a white mineral powder.

7. A molding powder comprising white methylol urea and a pure white mineral powder.

8. A molding powder comprising dried methylol urea, incorporated with a filler and capable of flowing in a hot-press and quickly setting.

9. A molding composition in comminuted form comprising dehydrated methylol urea and a filler.

10. A molding composition in fragmental form comprising a fusible mix containing a strongly dehydrated urea-formaldehyde compound intimately admixed with a filler.

11. A milky solid in acid condition obtained from the reaction mixture of urea and formaldehyde and a base, by the addition of an acid.

12. A dried material obtained by adding an acid to the reaction product of urea, formaldehyde, and a base, and drying the resultant product.

13. A molded product obtained by adding an acid to the reaction mixture of urea, formaldehyde, and a base, drying the resultant product, and molding the same under pressure greater than one ton per square inch.

14. A molding powder comprising methylolurea dehydrated to a point where it will just flow in a mold under a pressure of two tons at a temperature of about 320–350° F.

15. A clear transparent light colored molded article obtained from methylolurea in the presence of a catalyst causing quick setting.

16. A clear transparent light colored molded article obtained from a mixture approaching dimethylolurea in composition in the presence of a catalyst causing quick setting.

17. A molding composition containing methylolurea and free from alkaline reacting substances.

18. A molding composition containing methylolurea, a filler, and a salt.

19. A process which comprises reacting urea and formaldehyde together in the presence of a base, and then acidifying the resulting product to produce setting.

CARLETON ELLIS.